(12) United States Patent
Berthold et al.

(10) Patent No.: US 6,834,611 B2
(45) Date of Patent: Dec. 28, 2004

(54) PEST INFESTATION MONITORING DEVICE WITH POP-UP INDICATOR

(75) Inventors: Bret Alan Berthold, Kirkwood, MO (US); Glen W. Dorow, Wildwood, MO (US); Charles Duckworth, Defiance, MO (US)

(73) Assignee: United Industries Corporation, St. Louis, MO (US)

( * ) Notice: Subject to any disclaimer, the term of this patent is extended or adjusted under 35 U.S.C. 154(b) by 0 days.

(21) Appl. No.: 10/372,034

(22) Filed: Feb. 21, 2003

(65) Prior Publication Data

US 2004/0163303 A1 Aug. 26, 2004

(51) Int. Cl.[7] ............................................... A01M 1/20
(52) U.S. Cl. ..................... 116/281; 116/208; 43/131; 43/124; 43/132.1
(58) Field of Search ..................... 116/281, 200–201, 116/72, 208, 216–217; 43/107, 131, 132.1, 121, 124, 133; 119/650, 6.5, 57.9

(56) References Cited

U.S. PATENT DOCUMENTS

| | | | |
|---|---|---|---|
| 4,485,582 A | 12/1984 | Morris | |
| 5,555,672 A | 9/1996 | Thorne et al. | |
| 5,571,967 A | 11/1996 | Tanaka et al. | |
| 6,100,805 A | 8/2000 | Lake | |
| 6,266,918 B1 | 7/2001 | Henderson et al. | |
| 6,370,811 B1 | 4/2002 | Masterson | |
| 6,397,516 B1 | 6/2002 | Su | |
| 6,439,069 B1 | 8/2002 | Cates | |
| 6,526,692 B2 * | 3/2003 | Clark | 43/107 |
| 6,612,068 B1 * | 9/2003 | Aesch, Jr. | 43/132.1 |

* cited by examiner

Primary Examiner—Diego Gutierrez
Assistant Examiner—Tania Courson
(74) Attorney, Agent, or Firm—Armstrong Teasdale, LLP

(57) ABSTRACT

An indication device for monitoring a presence of a pest in a designated area includes a housing having a longitudinal axis and a plurality of openings therethrough. A trigger is positioned within the housing and is axially aligned with the longitudinal axis. An indicating member is coupled to the trigger and is axially aligned therewith, and a bias element is coupled to the indication member and is coaxial to the longitudinal axis.

19 Claims, 6 Drawing Sheets

US 6,834,611 B2

PEST INFESTATION MONITORING DEVICE WITH POP-UP INDICATOR

BACKGROUND OF THE INVENTION

This invention relates generally to pest control devices, and more particularly to devices for monitoring termite activity.

Infestation and damage caused by wood-destroying insect pests, particularly subterranean termites, is a continuing problem in buildings having wood structure. Infestation may result in significant structural damage requiring expensive repairs. Since termite infestation and resultant damage is generally not readily apparent, it is difficult to detect, especially when infected parts of a structure are not readily accessible for inspection. While structures may be professionally inspected from time to time for termite infestation and damage, it would be desirable to detect potential problems at a lower cost and before substantial damage has been done.

Bait stations for monitoring insect infestation, including termites, are known. Typically, the devices require physical monitoring by a user, which typically entails physical inspection by the user, and sometimes removal of a bait element from the station, to determine a presence or absence of insects. Aside from inconvenience of having to check and re-check the bait station for insect infestation, these devices can be difficult to access when inserted into the ground, and sometimes may even be difficult to find when located outdoors.

BRIEF DESCRIPTION OF THE INVENTION

In one aspect, an indication device for monitoring a presence of a pest in a designated area is provided. The indication device comprises a housing comprising a longitudinal axis and a plurality of openings therethrough. An element, sometimes referred to herein as a trigger, is positioned within the housing and is axially aligned with the longitudinal axis. An indicating member is coupled to the trigger and is axially aligned therewith, and a bias element is coupled to the indication member and is coaxial to the longitudinal axis.

In another aspect, an indication device for monitoring insect infestation is provided. The indication device comprises a housing comprising a longitudinal axis and a plurality of openings therethrough. An indicating member is coupled to the housing and is axially aligned therewith, and the indication member includes an axial bore aligned with the longitudinal axis. A trigger is received in the bore and is aligned with the longitudinal axis.

In another aspect, an indication device for monitoring termite infestation is provided. The indication device includes a housing comprising a central longitudinal axis and a plurality of openings therethrough. An indicating member is extends into the housing and is coaxial with the longitudinal axis, and the indicating member comprises a bore therein. A trigger is received in the bore and extends coaxial with the indication member. A collar is secured to an end of the housing, and the indicating member extends through the collar. A bias element is coupled to the indication member and is coaxial therewith. A bias element retainer element is secured to the bias element, and the bias element retainer element is positioned between the collar and the housing.

DETAILED DESCRIPTION OF THE INVENTION

Figure 1:
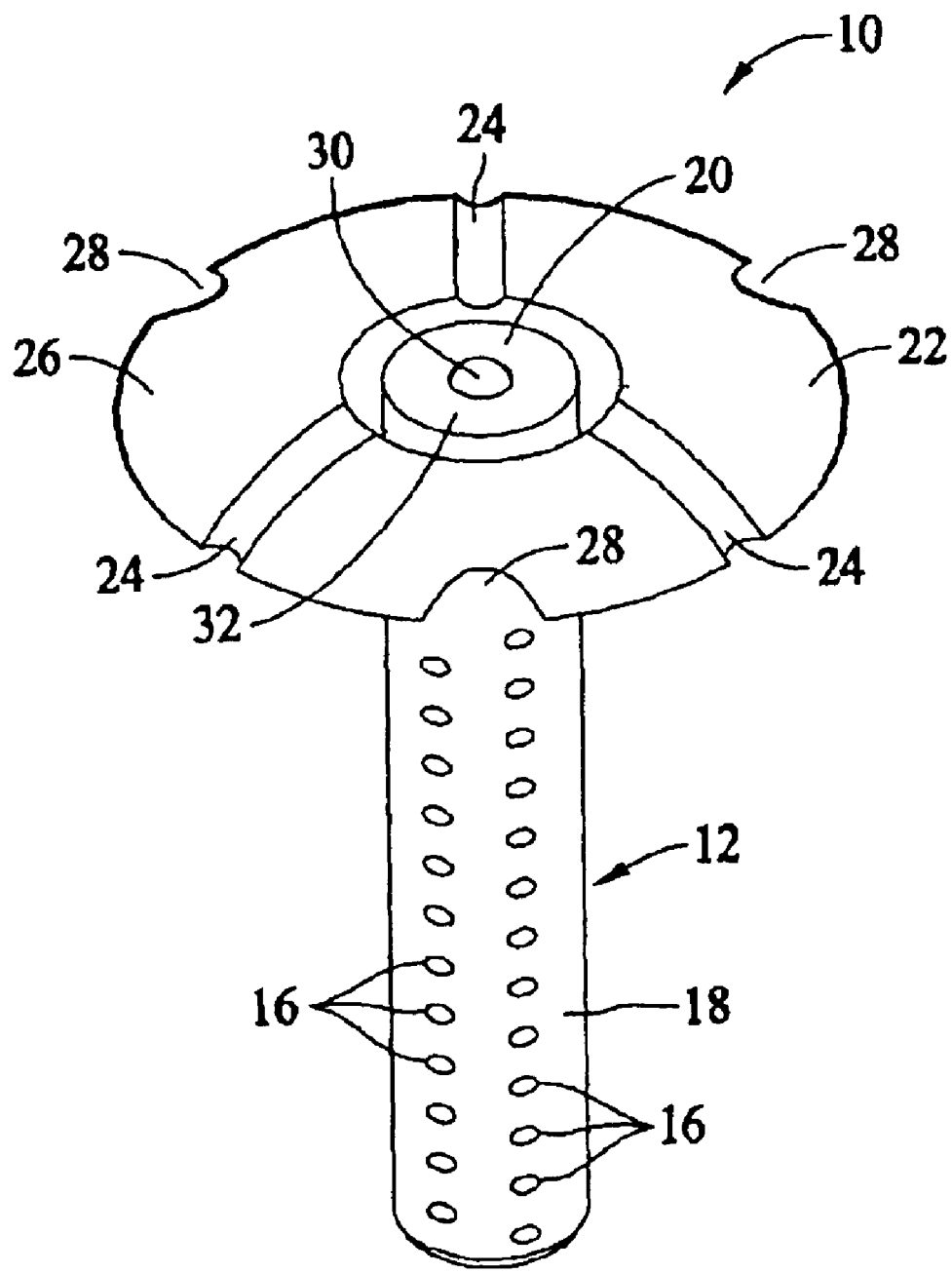
FIG. 1 illustrates an exemplary insect infestation indicating device.

FIG. 1 is a perspective view of an exemplary insect infestation indicating device 10 particularly suited for detecting, monitoring, and indicating the activity of invasive destructive organisms and insects, such as termites in an exemplary embodiment. For the reasons explained below, device 10 is constructed to reliably and consistently indicate infestation while offering ease of manufacturing and assembly at a relatively low cost.

The indicating device 10 includes a generally elongated cylindrical housing 12 having an elongate main cavity therein for receiving a trigger, described below. A plurality of entrance passages or openings 16 are formed in a side wall 18 of the housing 12 for admitting the destructive organisms (not shown) and allowing access to the trigger therein. A cover or collar 20 is affixed to an upper end of housing 12, and a shield 22 is received over housing 12 and accepts collar 20. An outer perimeter of shield 22 is substantially circular in an illustrative embodiment and provides a stable base for supporting housing 12 at ground level in use. Shield 22 includes a number of channels 24 in an outer surface 26 thereof, and channels 24 extend substantially radially from a center of shield 22 toward the outer perimeter thereof to facilitate drainage of water from the vicinity of collar 20 in use. Additionally, shield 22 includes a number of recesses or indentations 28 extending inward from an outer perimeter of the shield 22. Recesses 28 assist in removing device 10 from the ground by permitting fingers or perhaps a tool to be inserted under shield 22 for extraction from the ground.

While the illustrated embodiment includes an elongated cylindrical housing and a substantially circular shield, it is recognized that in further and/or alternative embodiments, other relative shapes of the housing and shield may be employed without departing from the scope of the invention. Further, it is recognized that shield 22 need not be present to achieve the advantages of the invention, and that other types and configurations of shields may be employed for other purposes and applications in lieu of monitoring subterranean insects. In other words, while the invention is described and illustrated in the context of a termite stake, it is understood that the invention is not limited to any particular application or end use. Device 10 is therefore provided by way of illustration rather than limitation of the invention.

An indicating member 30 extends through a top surface 32 of collar 20 and is positioned in a recessed or inactivated position wherein an end of indicating member 30 is substantially flush with collar top surface 32. As explained in some detail below, the indicating member 30 is positionable in an extended or activated position (not shown in FIG. 1 but described below) protruding upward from collar 20 when the trigger is sufficiently consumed by destructive organisms and insects, such as termites, to release a trigger mechanism within housing 12 that displaces indicator member 30 to the activated position. In an exemplary embodiment, device 10 is placed in a substantially upright position such that housing 12 extends downward into the ground and the shield 22 extends substantially parallel to and just above a surface of the ground. As such, device 10 presents little interference with movement across the ground surface while providing a visible indication above the ground when device 10 is activated. It is recognized, however, that device 10 may be employed above-ground for other desired applications, provided that organisms, insects, etc. to be monitored have sufficient access to device 10 to enter housing 12 through openings 16.

Figure 2:
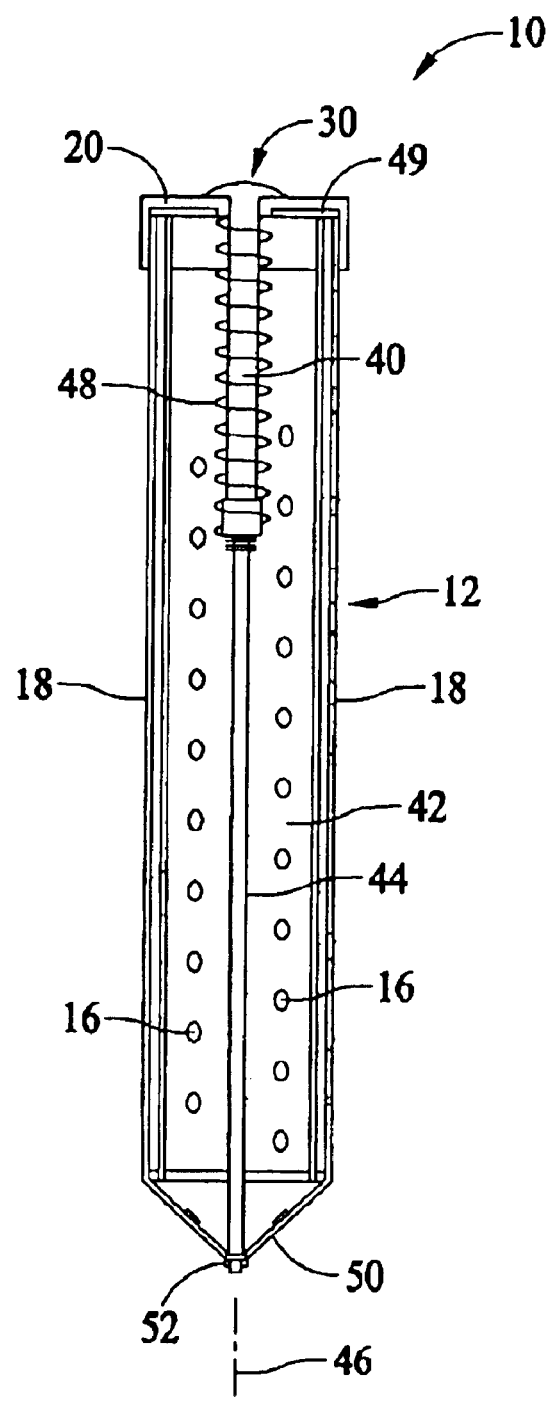
FIG. 2 is a cross sectional schematic view of a portion of the device shown in FIG. 1.

FIG. 2 is a cross sectional schematic view of device 10 with shield 22 removed and illustrating indicating member 30 in the retracted or inactivated position. Indicating member 30 extends through and is supported by collar 20 in a substantially centered position over an upper end of housing 12. Indicating member 30 includes an elongated shaft portion 40 extending downward into an interior hollow cavity 42 defined by side wall 18 of housing 12. A trigger element 44 is coupled to indicating member 40 and is axially aligned therewith along a longitudinal axis 46 extending through a center of housing 12. A bias element 48 is maintained in tension between a retaining washer 49 located beneath collar 20 and a lower end of indicator member 30 as described below. A lower end of trigger 44 is coupled to a pointed lower end 50 of housing 12 and is retained thereto with a retaining washer 52. In the position illustrated in FIG. 2, bias element 48 is pre-loaded in tension, and when released as further described below, bias element 48 recoils and displaces indicating member 30 to the activated or extended position.

Trigger 44 may be fabricated from a number of known materials edible by termites and capable of withstanding the force exerted by the bias element. A number of materials familiar to those in the art may be employed to fabricate trigger 44. In an exemplary embodiment, trigger 44 is an elongated wooden rod or dowel fabricated from pine, although it is appreciated, that rolled cardboard, cardboard strips, and composite materials formed of wood, saw dust, corn cob grit, pecan hulls, paper, other cellulose-based material and the like may be employed.

Additionally, a bait material (not shown) may be employed in conjunction with trigger 44 and surrounding trigger 44 to attract termites, for example. Trigger 44 may be impregnated or coated, for example, with a suitable attractant such as phermone, aspartic acid, termiticides, preservatives, humectants or the like. Further, in an exemplary embodiment, trigger 44 is an elongated wooden rod and is surrounded by rolled cardboard. It is recognized that the sensitivity of the device 10 is a function of the configuration of the trigger 44, dimensions of the housing 12 forming cavity 42 and the number of openings 16 through the housing side wall 18. Any of these attributes may be varied to suit the needs of a particular application.

Figure 3:
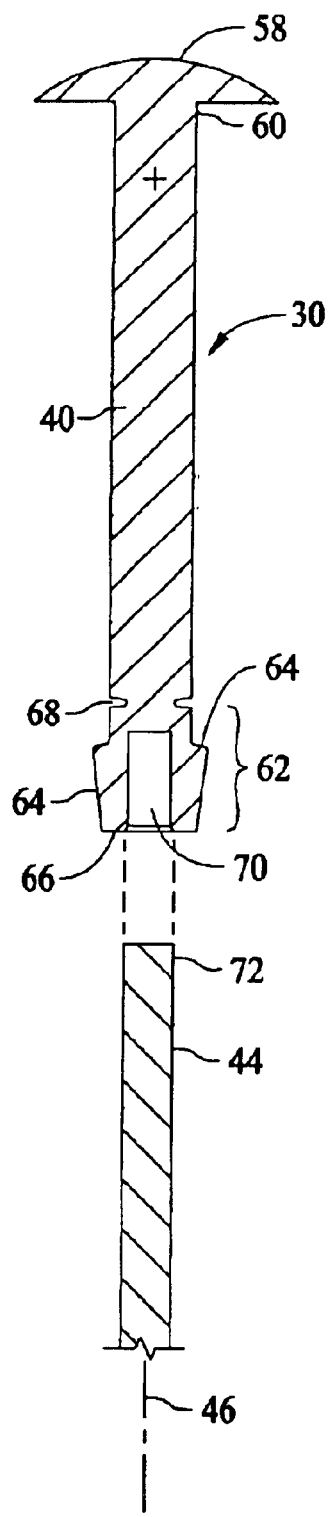
FIG. 3 is another cross sectional view of a portion of the device shown in FIG. 1.

FIG. 3 illustrates a cross sectional interface between indicating member 32 and trigger 44 which forms a portion of a trigger mechanism for device 10. In an illustrative embodiment, indicating member 30 is fabricated from a known resilient material and includes a rounded head portion 58 extending from an upper end 60 of shaft portion 40, and a coupler portion 62 extending form a lower end of shaft portion 40. Coupler portion 62 includes outwardly projecting flares 64 that provide a seat for bias element 48 (shown in FIG. 2). Flares 64 are outwardly tapered (i.e., increase in outer dimension) from a free end 66 of coupler portion 62 toward shaft portion 40. Indicating member 30 further includes an annular notch 68 extending about the circumference of shaft portion 40 adjacent coupler portion 62. Notch 68 permits some flexibility and freedom of movement of indicating member shaft portion 40 relative to coupler portion 62. As such, some misalignment of indicating member 30 and/or trigger 44 is tolerable without impairing the function of indicator member 30.

In an exemplary embodiment, coupler portion 62 of indicating member 30 further includes a central bore 70 extending inward a predetermined distance from coupler portion free end 66 toward shaft portion 40. Bore 70 is inwardly tapered from free end 66 to provide a guide surface for an end 72 of trigger 44 when end 72 is inserted into bore 70. In an exemplary embodiment, end 72 of trigger 44 is adhesively attached to coupler portion 62 when end 72 is received in bore 70. It is appreciated, however, that other connection schemes known in the art may be employed to securely connect trigger 44 to coupler portion 62, including but not limited to interference fit engagement, tongue and groove or latch detent arrangements, and the like.

Notably, by coupling trigger 44 and indicating member 30 through bore 70 of coupler portion 62, the trigger 44 and shaft portion 40 of indicating member 30 are substantially axially and longitudinally aligned with respect to longitudinal axis 46 of device 10. Axial aligument of the trigger mechanism facilitates reliable indication action of device 10 by preventing jamming of indicating member 30 when bias element 48 (shown in FIG. 1) is released.

Figure 4:
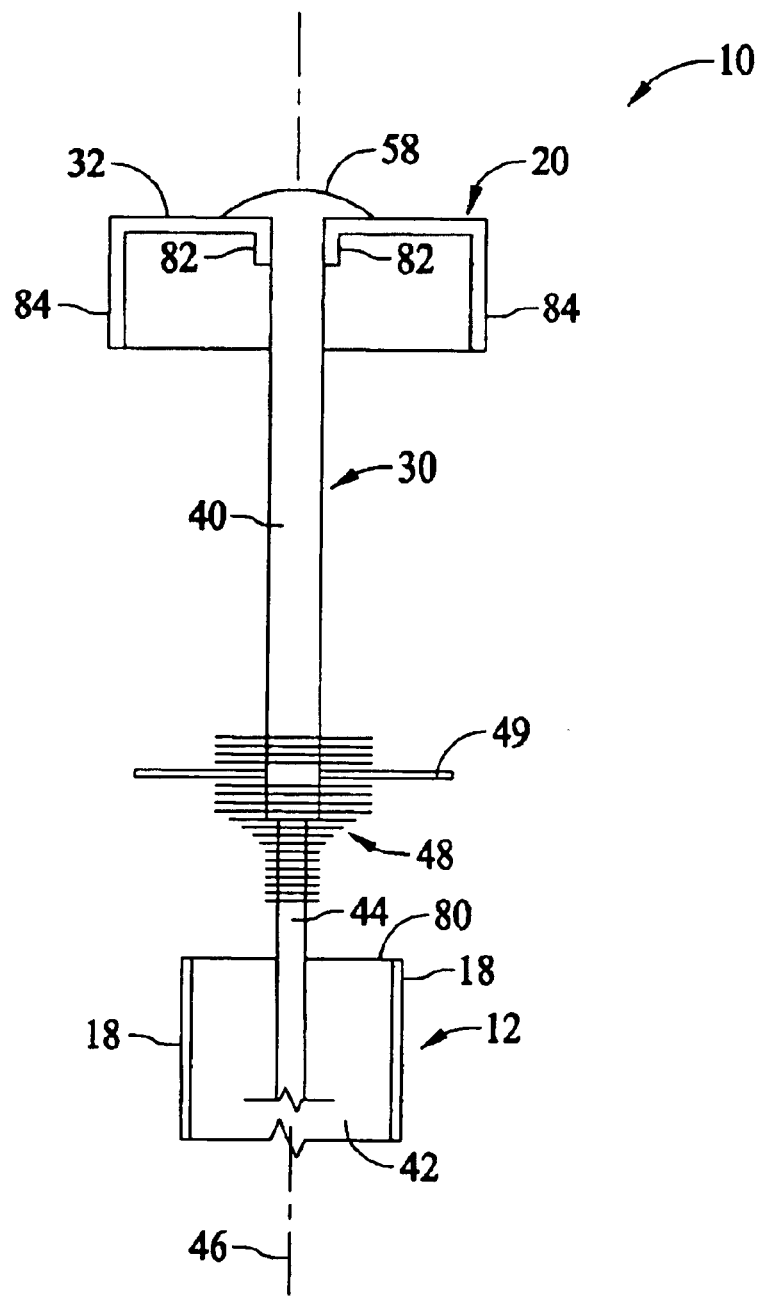
FIG. 4 is partial schematic assembly view of the device shown in FIG. 1.

FIG. 4 is partial schematic assembly view of device 10 illustrating the trigger mechanism. The indicating member 30 is connected to trigger 44 as described above, and bias element 48 is seated upon an outer surface of flares 64 (shown in FIG. 3) on end thereof. An opposite end of bias element 48 is positioned above a retaining washer 49 that is fitted over indicating member shaft portion 40.

Bias element 48 is illustrated in FIG. 4 in a relaxed state, and in an illustrative embodiment bias element 48 is a known coil spring element helically extending about an outer surface of indicating member 30 and extending concentrically with element 44 and indicating member 30. Bias element 48 is tapered from one end to the other in an illustrative embodiment. In other words, an outer diameter of the coils of spring element 48 increases along the length of the spring element relative to longitudinal axis 46, with the larger diameter portion coupled to the retaining washer 49. Tapering of bias element 48 facilitates self-centering of the trigger mechanism as bias element 48 is released and further prevents jamming of the indicating member 30 when the trigger mechanism is activated. Washer 49 is received between the coils of the larger diameter end of the spring element, and as washer element 49 is moved axially along indicating member shaft portion 40 toward head portion 58, bias element 48 is loaded in tension.

Retaining washer element 49 is supported on an upper end 80 of housing 12. As element 44 is extended into cavity 42 of housing 12, retaining washer element 49 contacts upper end 80 and bias element 48 is stretched to the loaded inactivated position (shown in FIG. 2) as retaining washer element 49 is axially displaced away from element 44 and toward collar 20. Notably, and as illustrated in FIGS. 2 and 4, bias element 48 is axially aligned with longitudinal axis 46 of device 10. Bias element 49, element 44, and indicating member 30 are therefore axially aligned along a common axis, which facilitates reliable indicating action without jamming, and also facilitates assembly of the device 10.

Collar 20 is fitted over indicating member shaft portion 40, and collar 20 includes an internal side wall 82 circumferentially surrounding an outer surface of indicating member shaft portion 40. Side wall 82 forms a guide surface and support for shaft portion 40 of indicating member 30, and prevents misalignment of indicating member 30 with respect to collar 20 that could cause jamming of the indicating member. Outer side walls 84 extend from collar top surface 32 and are dimensioned to engage side walls 18 of housing 12 as device 10 is assembled.

Figure 5:
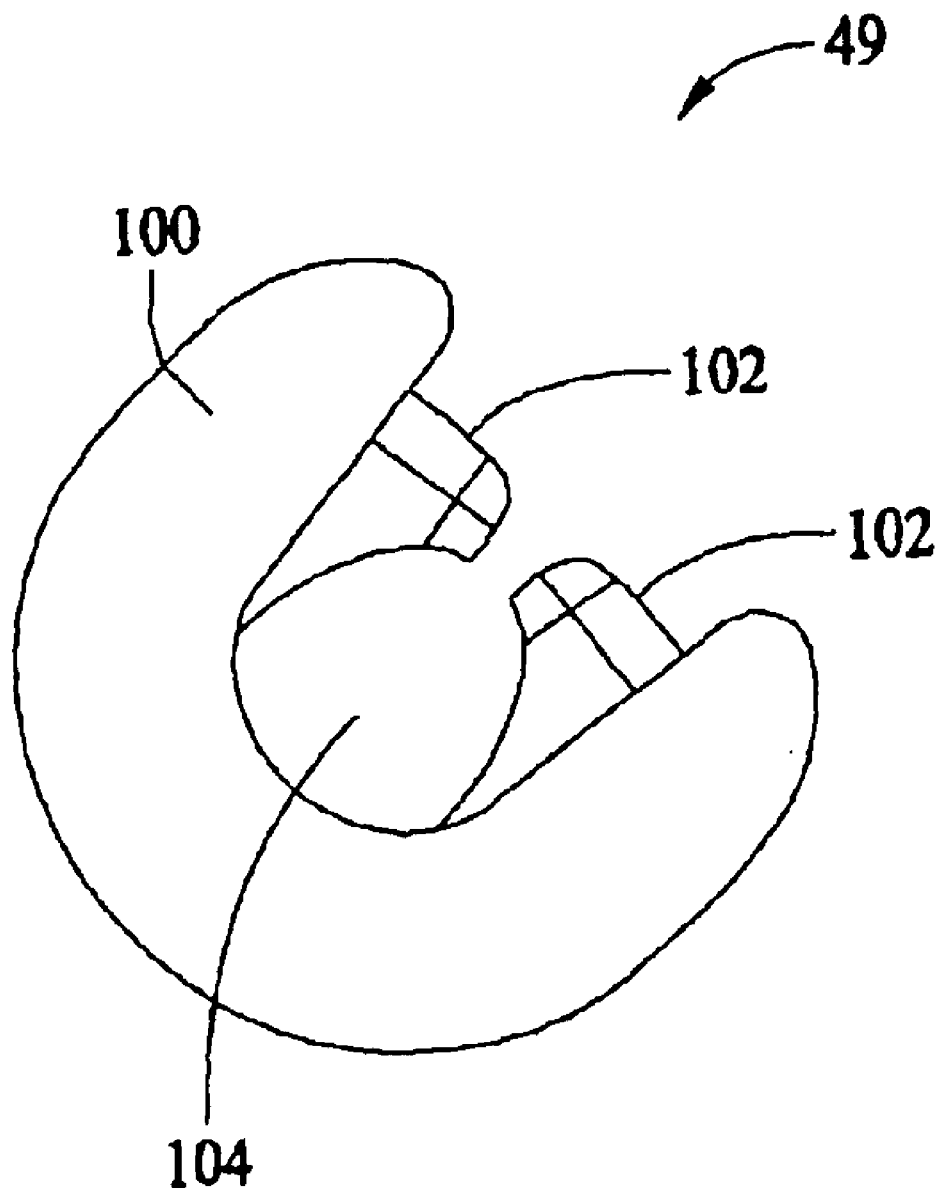
FIG. 5 is a perspective view of a bias element retaining member for the device shown in FIG. 1.

FIG. 5 is a perspective view of bias element retaining member 49 in an exemplary embodiment. Retaining member 49 is a relatively thin member having a body 100 shaped like a horseshoe, and inwardly depending fingers 102 extending inwardly from the legs of the horseshoe shaped body. The fingers 102 are further downwardly turned out of the plane of the horseshoe shaped body 100, and an interior surface of the fingers define a receptacle 104 dimensioned to receive indicating member shaft portion 40 together with the curved portion of the horseshoe shaped body 100. As device 10 is assembled, fingers 102 are resiliently depressed and secure bias element 48 to retaining member 49.

In an exemplary embodiment, retaining element 49 is integrally formed with shield 22 and is punched from an interior portion of the shield 22 wherein collar 20 is received as shown in FIG. 1. Material savings may therefore be realized.

Figure 6:
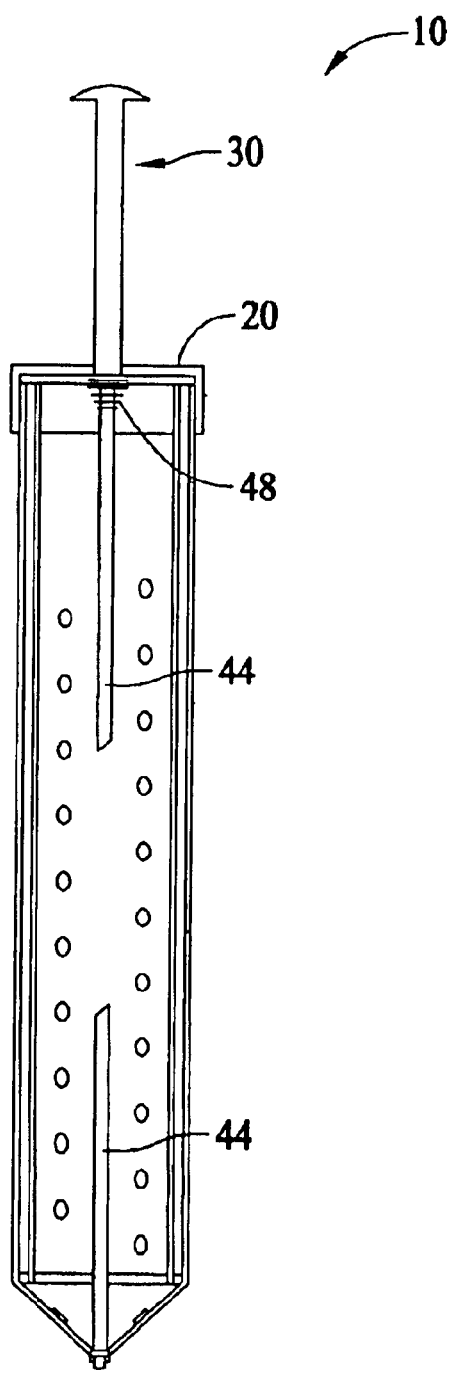
FIG. 6 is a cross sectional schematic view similar to FIG. 2 but illustrating the device in an indicating position.

FIG. 6 illustrates device 10 in the extended or activated position wherein the trigger mechanism has been operated. Element 44 is severed or broken due to consumption by, for example, termites that have structurally weakened the trigger to the point where it can no longer withstand the applied force of bias element 48 in the loaded or inactivated position (shown in FIG. 2). In the activated position, bias element 48 returns to its relaxed configuration (shown in FIG. 4), thereby displacing indicating member 30 upwardly through collar 20. By virtue of the axial alignment of the bias element 48, the element 44 and the indicating member 30, together with side wall 82 (shown in FIG. 4) of collar 20 and the tapered bias element 48, indicating member 30 is sufficiently self-centered to prevent jamming of the indicating member. Reliable displacement of indicating member 30 is therefore ensured, and consistent and uniform indication is provided.

Having now described device 10 in detail, an exemplary method of manufacturing and assembling device 10 will now be described. The shield 22 (shown in FIG. 1) and spring retaining washer 49 (shown in FIGS. 2, 4, and 5) are integrally fabricated from a known material, including but not limited to thermoplastic materials according to a known process, and the integral spring retaining washer 49 is removed from the interior of the shield 22 by snapping retaining tabs joining the two together during formation of the integral shield 22 and retaining member 49. Indicating member 30 (shown in FIGS. 2–4) is inserted through collar 20 (shown in FIGS. 1, 2 and 4), and a small amount of epoxy glue into is introduced into bore 70 (shown in FIG. 3) of coupler portion 62 of indicating member 30. End 72 (shown in FIG. 3) of trigger 44 (shown in FIGS. 2–4) is then inserted into bore 70 and the glue is set to securely couple element 44 to coupler portion 62 of indicating member 30.

Once element 44 and indicating member 30 are securely coupled, bias element 48 (shown in FIGS. 2 and 4) is installed over coupler portion 62 with the small diameter end seating on flares 64 (shown in FIG. 3), thereby establishing an interference fit between flares 64 and the small diameter end of bias element 48. Bias element retaining member 49 is then installed onto the large diameter end of bias element 49 with about 2 to about 4 spring coils extending over the top of retaining member 49.

If desired, a rolled up piece of cardboard may be inserted into housing 12, and trigger 44 is inserted into the open end 80 (shown in FIG. 4) of housing 12 until element 44 extends through an opening in pointed end 50 (shown in FIG. 2) of housing 12. Grasping the protruding element 44 and pulling it through the housing 12 until the bias element retaining washer 49 contacts the end 80 of housing 12 begins to load spring element 48. When the spring retaining washer 49 is centered on the end 80 of housing 12, collar 20 may be pushed onto housing 12 until it is snapped over a retaining collar of housing 12.

Continuing to pull element 44 through housing 12 until head portion 58 (shown in FIGS. 2–4) of indicating member is flush with collar 20 fully loads bias element 48. Once bias element 48 is fully loaded, retaining washer 52 is inserted over the protruding end of element 44, and element 44 is pulled through the washer 52 until pointed end 50 of the housing 12 abuts the washer. Element 44 is then trimmed to a substantially flush position with tapered end 50 tapered tip of the stake housing. Pointed end 50 is then dipped in an epoxy and cured to complete the assembly.

According to the method set forth above, bias element 48 may be reliably coupled to the trigger mechanism and uniformly loaded to produce reliable infestation indication with little variation between different devices 10. Axial alignment of the trigger mechanism components to avoid jamming is achieved, and the method maybe implemented in a straightforward manner at a relatively low cost.

While the invention has been described in terms of various specific embodiments, those skilled in the art will recognize that the invention can be practiced with modification within the spirit and scope of the claims.

What is claimed is:

1. An indication device for monitoring a presence of a pest in a designated area, said indication device comprising:
   a housing comprising a longitudinal axis and a plurality of openings therethrough;
   a trigger positioned within said housing and axially aligned with said longitudinal axis;
   an indicating member coupled to said trigger and axially aligned therewith; and
   a bias element fastened to said indication member, said bias element coaxial to said longitudinal axis and comprising a tapered spring having an outer diameter which increases along an axial length of said spring, said bias element preloaded in tension until said trigger is sufficiently weakened by the monitored pest.

2. An indication device in accordance with claim 1 further comprising a bias retainer element supported on said housing and fastened to said bias element.

3. An indication device in accordance with claim 2 wherein said retainer element comprises a housing and inwardly extending fingers defining a receptacle for said indicating member.

4. An indication device in accordance with claim 1 further comprising a collar comprising a guide surface, said indicating member extending through said guide surface.

5. An indication device in accordance with claim 1 further comprising a shield surrounding said housing, said indicating member extending above said shield when in an activated position.

6. An indication device in accordance with claim 1 wherein said indicating member comprises a head portion, a shaft portion, and a coupler portion.

7. An indication device in accordance with claim 1 wherein said indicating member comprises a coupler portion, said coupler portion outwardly flared and providing a seat for said bias element.

8. An indication device in accordance with claim 1 wherein said indicating member comprises a central bore, said trigger received in said bore.

9. An indication device for monitoring insect infestation, said indication device comprising:
- a housing comprising a longitudinal axis and a plurality of openings therethrough;
- an indicating member coupled to said housing and axially aligned therewith, said indicator member including an axial bore aligned with said longitudinal axis and an outwardly tapered side wall surrounding said bore;
- a trigger received in said bore and aligned with said longitudinal axis; and
- a biasing element coupled to said indicating member and displacing said indicating member to an activated position when said trigger is sufficiently weakened.

10. An indication device in accordance with claim 9 wherein said bias element envelopes a portion of said indication member.

11. An indication device in accordance with claim 10, wherein said bias element comprises a tapered spring seated against said tapered side wall.

12. An indication device in accordance with claim 11 further comprising a bias retainer element supported on said housing and fastened to said bias element.

13. An indication device in accordance with claim 9 further comprising a collar, said indicating member extending through said collar.

14. An indication device in accordance with claim 9 wherein said indicating member comprises a head portion, a shaft portion, and a coupler portion.

15. An indication device in accordance with claim 9 wherein said indicating member comprises a coupler portion, said coupler portion defining said outwardly tapered side wall and configured to provide a seat for said bias element.

16. An indication device for monitoring termite infestation, said indication device comprising:
- a housing comprising a central longitudinal axis and a plurality of openings therethrough;
- an indicating member extending into the housing, said indicating member coaxial with said longitudinal axis, said indicating member comprising a bore therein;
- a trigger received in said bore and extending coaxial with said indication member;
- a collar secured to an end of said housing, said indicating member extending through said collar;
- a bias element fastened to said indication member and coaxial therewith; and a bias element retainer element secured to said bias element, said bias element retainer element positioned between said collar and said housing, thereby preloading said bias element in tension when said trigger is fixed in said bore at a predetermined position.

17. An indication device in accordance with claim 16 wherein said bias element comprises a tapered spring.

18. An indication device in accordance with claim 16 wherein said indicating member comprises a shaft portion and a coupler portion, said coupler portion configured to provide a seat for one end of said preloaded bias element.

19. An indication device in accordance with claim 16 wherein said retainer element comprises a housing and inwardly extending fingers defining a receptacle for said indication member.

* * * * *